United States Patent
Doll

(10) Patent No.: US 9,129,550 B2
(45) Date of Patent: *Sep. 8, 2015

(54) ADJUSTING ORIENTATION OF CONTENT REGIONS IN A PAGE LAYOUT

(71) Applicant: Flipboard, Inc., Palo Alto, CA (US)

(72) Inventor: Evan R. Doll, Menlo Park, CA (US)

(73) Assignee: Flipboard, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/504,178

(22) Filed: Oct. 1, 2014

(65) Prior Publication Data

US 2015/0015614 A1     Jan. 15, 2015

Related U.S. Application Data

(63) Continuation of application No. 13/188,413, filed on Jul. 21, 2011, now Pat. No. 8,872,855.

(51) Int. Cl.
    *G09G 5/00*          (2006.01)
    *G06F 17/00*       (2006.01)
    *G06F 3/048*       (2013.01)
    *G09G 5/14*         (2006.01)

(52) U.S. Cl.
    CPC .......... *G09G 5/14* (2013.01); *G09G 2340/0492* (2013.01)

(58) Field of Classification Search
    CPC .......... G06T 3/60; G06T 3/602; G06T 3/606; G06F 3/04848; G06F 17/211; G06F 17/212; G06F 17/30905; G06F 2200/1614; G09G 2340/0492

USPC .................. 345/649–659; 715/243–246, 249
See application file for complete search history.

(56) References Cited

U.S. PATENT DOCUMENTS

| | | | |
|---|---|---|---|
| 8,266,550 B1 * | 9/2012 | Cleron et al. ................. | 715/863 |
| 2004/0078759 A1 | 4/2004 | Ohashi et al. | |
| 2007/0174782 A1 | 7/2007 | Russo | |
| 2009/0002391 A1 | 1/2009 | Williamson et al. | |
| 2012/0324400 A1 | 12/2012 | Caliendo et al. | |

OTHER PUBLICATIONS

United States Office Action for U.S. Appl. No. 13/188,413, Feb. 11, 2014, 16 pages.
United States Office Action for U.S. Appl. No. 13/188,413, Sep. 18, 2013, 11 pages.
United States Office Action for U.S. Appl. No. 13/188,413, Mar. 1, 2013, 10 pages.

* cited by examiner

*Primary Examiner* — Ke Xiao
*Assistant Examiner* — Jed-Justin Imperial
(74) *Attorney, Agent, or Firm* — Fenwick & West LLP

(57) ABSTRACT

When a device is rotated from a portrait orientation to landscape orientation, or vice versa, the display device rotates the content items within distinct respective content regions of a page template ("slots") that each appear to stay in their same position with respect to a frame of reference of the display device. While the content regions stay in their same positions, the content within each content region counter-rotates in place to offset the rotation of the display device. Thus, the content within the content regions maintains an orientation with respect to a constant (non-rotating) frame of reference, regardless of the orientation or rotation of the display device. In one embodiment, a slot's position, height, and width in a template in a second orientation are determined from the slot's position, height, and width in the template in a first orientation.

18 Claims, 8 Drawing Sheets

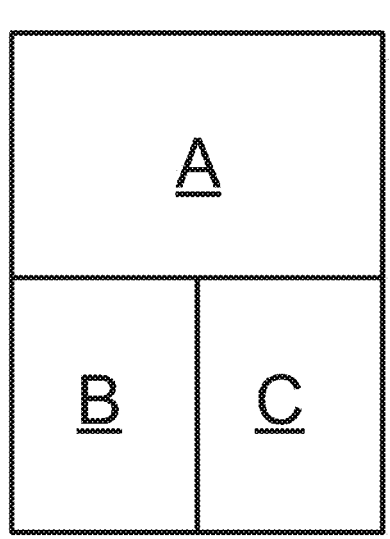
Fig. 1A
PRIOR ART
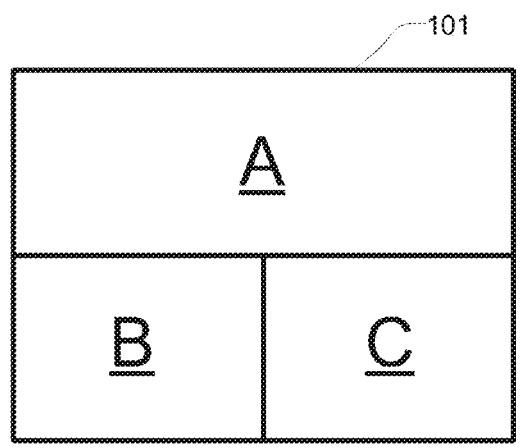
Fig. 1B
PRIOR ART
Fig. 2A
PRIOR ART
Fig. 2B
PRIOR ART

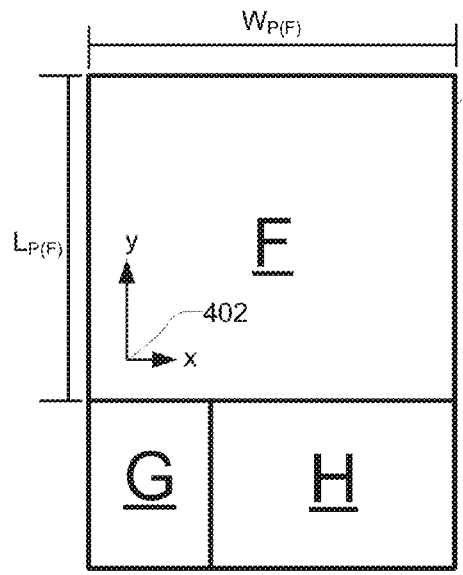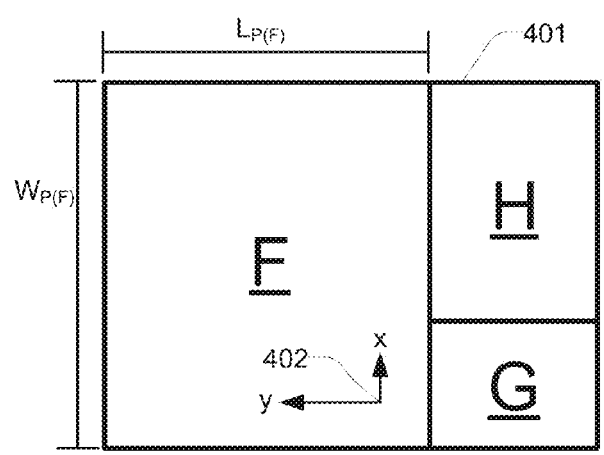
Fig. 4A
Fig. 4B
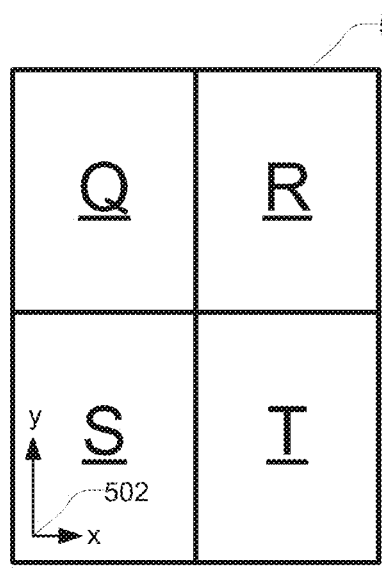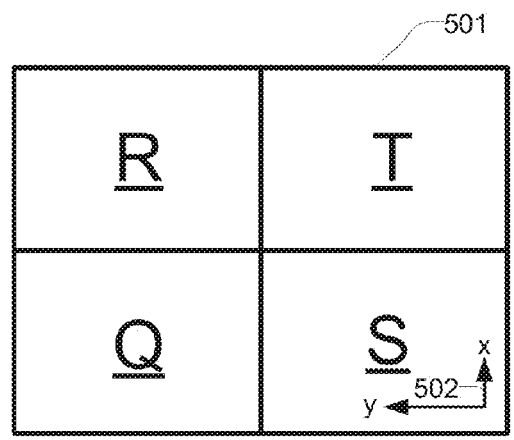
Fig. 5A
Fig. 5B

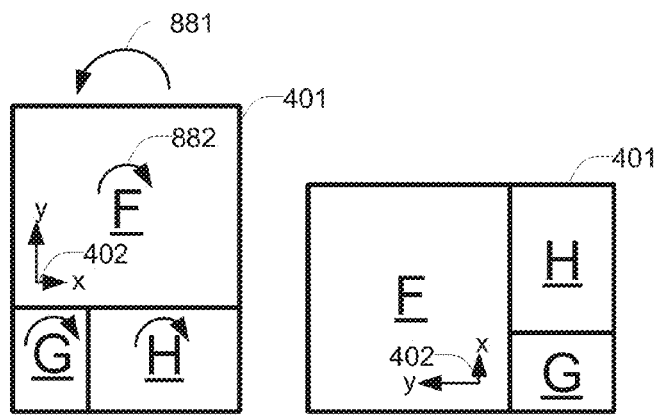
Fig. 8A          Fig. 8B
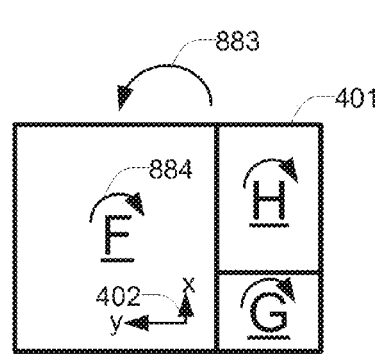     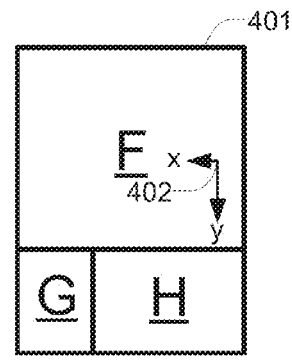
Fig. 8C          Fig. 8D

ADJUSTING ORIENTATION OF CONTENT REGIONS IN A PAGE LAYOUT

CROSS REFERENCE TO RELATED APPLICATIONS

This application is a continuation of co-pending U.S. application Ser. No. 13/188,413, filed Jul. 21, 2011, which is incorporated by reference in its entirety.

BACKGROUND

This invention relates to automatically adjusting the orientation of content regions within a page layout when a display device is rotated from portrait to landscape view, or vice versa.

The proliferation of handheld computing devices with limited screen sizes has lead to a high demand for software applications that can displayed in either landscape or portrait orientations, depending on a user's viewing preference. Because switching a handheld computing device, such as a smartphone or a tablet computer, between landscape and portrait orientations involves simply adjusting how the device is being held, the user may choose to switch back and forth between orientations at will.

Commonly, when a user rotates the display of the computing device to/from a portrait orientation from/to a landscape orientation, the entire layout of a displayed page rotates as a whole. FIG. 1A illustrates an example layout 101 on a display device of content regions A, B, and C in a portrait orientation. FIG. 1B illustrates the layout 101 of the content regions A, B, and C in a landscape orientation, following a 90 degree rotation. In this example, the content regions stay in their relative positions, with region A across the entire top half of the display, and regions B and C on the bottom half, and change their position with respect to the device itself. In addition, the aspect ratios of each content region changes to accommodate the difference in dimensions between portrait and landscape orientations in their new positions. The layout of the content within a region may change, for example, by reflowing the text of a region across the wider width of the region when the orientation of the page has been changed from portrait orientation to landscape orientation. FIGS. 2A and 2B also show a change from a portrait orientation to a landscape orientation by 90 degree rotation. Here, too, when the orientation of the page has been changed, the full content of a region may no longer fit the page in the new orientation. Whereas in the portrait orientation shown in FIG. 2A, twelve lines of content were visible in each of regions D and E of the layout 102, in the landscape orientation shown in FIG. 2B, only eight lines of content are visible in each of regions D and E. The user may have to resort to scrolling horizontally or vertically in order to view the entire content of the page that was originally formatted for the other orientation.

SUMMARY

In one aspect, a display device is configured to control the layout of content items on the device. When the device is rotated from a portrait orientation to landscape orientation, or vice versa, the display device rotates the content items within distinct respective content regions of a page template ("slots") that each appear to stay in their same position with respect to a frame of reference of the display device. While the content regions stay in their same positions, the content within each content region counter-rotates in place to offset the rotation of the display device. Thus, the content within the content regions maintains an orientation with respect to a constant (non-rotating) frame of reference, regardless of the orientation or rotation of the display device.

In one embodiment, a slot's position, height, and width in a template in a second orientation are determined from the slot's position, height, and width in the template in a first orientation. A reference point for each slot is determined. The reference point for each slot is translated from being in terms of the dimensions of the template in the first orientation to being in terms of the dimensions of the template in the second orientation. The slot height in the first orientation is set to the slot width in the second orientation, and the slot width in the first orientation is set to the slot height in the second orientation. Thus, the slot maintains the same area in the second orientation as in the first orientation, but the dimensions are reversed. Similarly, the slot's aspect ratio is also merely reversed (e.g., 4:3 becomes 3:4), rather than the being stretched or squeezed into an entirely different aspect ratio.

In another embodiment, the orientation of content regions of a page layout is adjusted between portrait orientation and landscape orientation, and vice versa. Content is displayed in a plurality of content regions of a page template in a first orientation. Responsive to a rotation of the display of the device from a first orientation to a second orientation, the content is counter-rotated in each respective content region so that the content remains in a constant orientation (i.e., right side up) with respect to a constant (non-rotating) frame of reference. The plurality of content regions appears in the same locations in the second orientation as they were in the first orientation with respect to a frame of reference of the display of the device.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 1A illustrates a prior art example layout of three content regions in portrait orientation. FIG. 1B illustrates a prior art layout of the three content regions of FIG. 1A in landscape orientation.

FIG. 2A illustrates a prior art example layout of two content regions in portrait orientation. FIG. 2B illustrates a prior art layout of the two content regions of FIG. 2A in landscape orientation.

FIG. 4A illustrates an example template in a portrait orientation in accordance with an embodiment of the invention. FIG. 4B illustrates the example template from FIG. 4A in a landscape orientation.

FIG. 5A illustrates another example template in a portrait orientation in accordance with an embodiment of the invention. FIG. 5B illustrates the example template from FIG. 5A in a landscape orientation.

FIG. 8A-D illustrate an example sequence in rotating content regions in a page layout from a portrait orientation to a landscape orientation back to a portrait orientation, in accordance with an embodiment.

Figure 3:
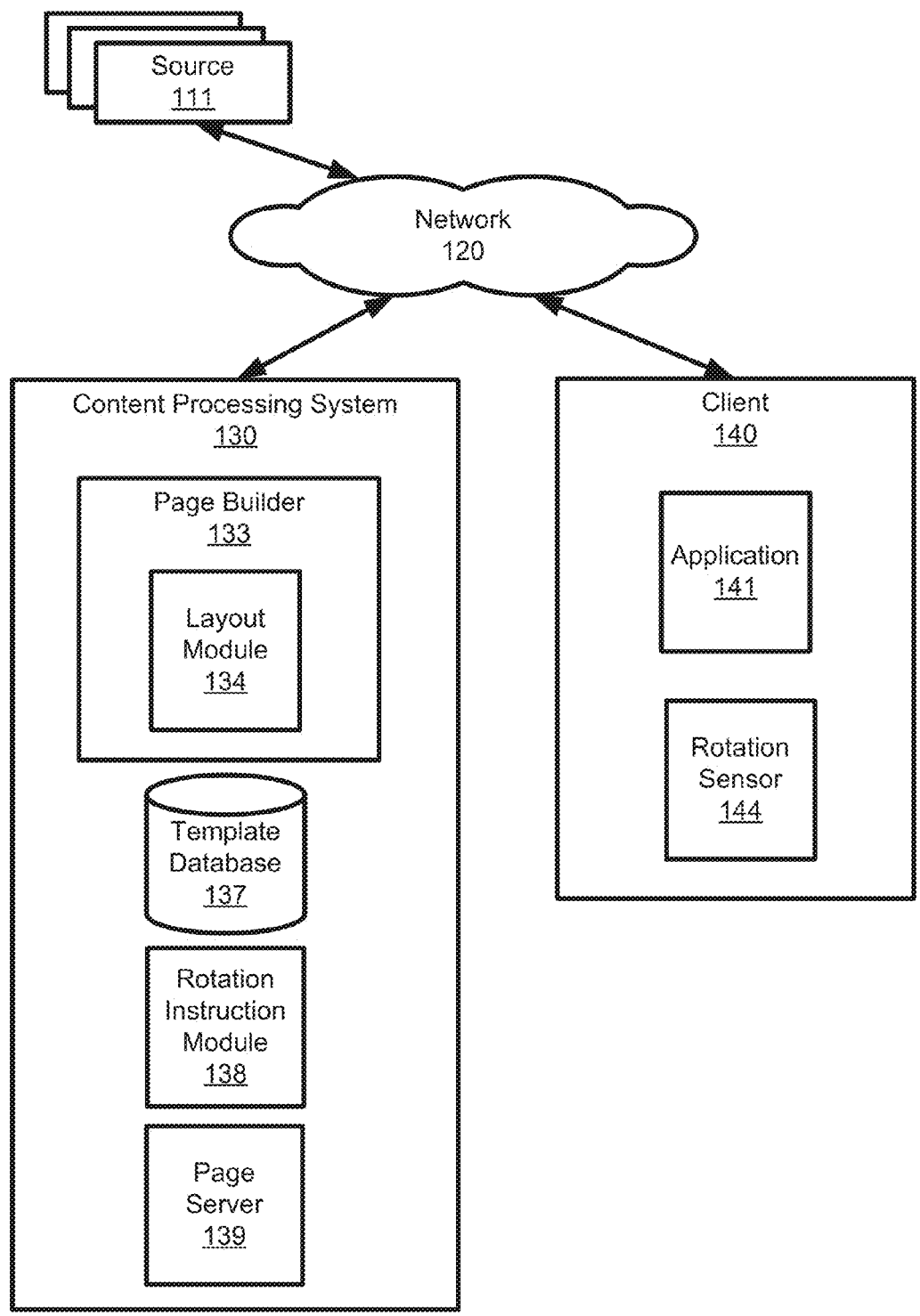
FIG. 3 is a high-level block diagram of a system environment in accordance with an embodiment of the invention.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Embodiments of the invention adjust the orientation of content regions of a page when a display is rotated from portrait orientation to landscape orientation and vice versa. Template-based page layouts generate aesthetically pleasing layouts that enable a user to browse content items through a series of discrete pages, each of which fit into the available display area of a display device without requiring the user to scroll. When a user changes the display from portrait orientation to landscape orientation, or vice versa, the content items rotate within distinct respective regions of a page ("slots") that each appear to stay relatively constant (e.g., same position) with respect to a frame of reference of the display device. FIG. 1 is a high-level block diagram of a system environment in accordance with one embodiment. The system environment includes a plurality of sources 111, a content processing system 130, and a client 140 connected via a network 120, such as the Internet.

The sources 111 comprise various sources of content such as text, images, video, or audio on web pages, web feeds, social networks, or other distribution platforms. The content may include user-generated content such as blogs, tweets, shared images, video or audio, and social networking posts and status updates. For convenience, content from a source, regardless of its composition, will be referred to herein as a "content item" or simply "content."

The content processing system 130 receives content items from the sources 111, processes the content items in order to build pages according to page templates, and serves the pages to a client 140. The content processing system 130 includes a page builder 133, a template database 137, a rotation instruction module 138, and a page server 139. The content processing system 130 may be implemented using a single computer, or a network of computers, including cloud-based computer implementations. The computers are preferably server class computers including one or more high-performance CPUs and 1 G or more of main memory, as well as 500 Gb to 2 Tb of computer readable, persistent storage, and running an operating system such as LINUX or variants thereof. The operations of these systems as described herein can be controlled through either hardware or through computer programs installed in computer storage and executed by the processors of such servers to perform the functions described herein. The systems include other hardware elements necessary for the operations described here, including network interfaces, networking devices (e.g., routers, firewalls) and protocols, input devices for data entry, and output devices for display, printing, or other presentations of data, which are not shown so as to not obscure the relevant details of the system.

The page builder 133 of the content processing system 130 is configured to build pages that include the content items received from the sources 111, and is one means for performing this function. The page builder 133 includes a layout module 134 configured to lay out pages according to page templates selected from the template database 137, and is one means for performing this function. The templates allow content items from a variety of sources to be laid out on a common page in a manner that presents a visually aesthetically appealing design. Templates that contribute to a visually appealing design accommodate a variety of sizes of content items, include on the order of three to seven content items per page, and are sized appropriately for the display device of the client 140 to avoid horizontal or vertical scrolling. Examples of templates from the template database 137 are described in more detail below, with reference to FIGS. 4A-5B.

The rotation instruction module 138 provides instructions for altering a page template based on the orientation of the display, and is one means for performing this function. The rotation instruction module 138 may provide a mapping between the location of a template slot in portrait orientation and the location where the slot should appear in a landscape orientation of the page.

The page server 139 is configured to receive the pages completed by the page builder 133, and serve the completed pages to a client 140 via the network 120, and is one means for performing this function. In one embodiment, the page server 139 serves the completed pages along with rotation instructions from the rotation instruction module 138 to a client 140.

The client 140 can be any computing device equipped with an application 141 for accessing web content and a display for viewing them, such as a personal computer, a tablet computer, or a mobile device such as a smartphone. The client 140 receives the formatted page from the page server 139 and displays it to the user. The user can select to view the page in portrait orientation or landscape orientation by physically rotating the device from one orientation to another, and freely alternate between these orientations. The client 140 may follow the rotation instructions from the rotation instruction module 138 in order to display the page in the orientation selected by the user. The client 140 may be further equipped with a rotation sensor 144 to sense the orientation of the display of the client 140 so that the page can be displayed in the corresponding orientation, and is one means of performing this function. While only a single client 140 is shown in FIG. 1, in practice there may be thousands, or even millions of clients 140 in communication with the system 130.

Thus, from the viewpoint of a user of the client 140, a variety of content items from a variety of sources 111 are automatically rendered in a page layout on the client 140. The user can rotate the device to change the display of the page between portrait and landscape orientations, and the content in the content regions of the page layout appears to rotate in place while each region appears to stay in the same location with respect to a frame of reference of the display device. Accordingly, the user can achieve a magazine-like reading experience of a variety of content items from a variety of sources without the inconvenience of horizontal or vertical scrolling to see other items on the page, regardless of the orientation of the display.

Page Templates

A page template describes a spatial arrangement ("layout") by which content items are arranged for presentation on a display device. A template is comprised of content regions ("slots"), wherein each slot will hold one content item. Each slot has a length and a width. FIG. 4A illustrates an example page template 401 in portrait orientation having three slots labeled F, G, and H, and FIG. 4B illustrates the same template in landscape orientation. In one embodiment, the area of each slot is approximately the same in portrait orientation as landscape orientation, but the dimensions of length and width are exchanged from one orientation to the other. In other words, for a slot F, the length of the slot in portrait orientation, $L_{P(F)}$ shown in FIG. 4A, is the width of the slot in landscape orientation shown in FIG. 4B, whereas the width of the slot in portrait orientation, $W_{P(F)}$ shown in FIG. 4A, is the length of the slot in landscape orientation shown in FIG. 4B. In contrast to the prior art example of FIG. 1A-B, the content regions shown in FIG. 4A-B stay relatively constant with respect to a frame of reference 402 of the display device. In both orientations, the content within the content regions F, G, and H appears "right side up" to be easily readable by the user. In both orientations of the template, the content within the content regions F, G, and H are maintained in the same orientation with respect to a constant (non-rotating) frame of reference. Thus, it appears to the user that the content has rotated inside of individual regions that have been held in constant positions with respect to a frame of reference 402 of the display device.

FIG. 5A illustrates another example page template 501 in portrait orientation. This template has four slots labeled Q, R, S and T. FIG. 5B illustrates the template 501 of FIG. 5A in landscape orientation. Note in this example that the area of each slot remains the same in each orientation, but the dimensions of length and width are exchanged from one orientation to the other, as was demonstrated above in FIGS. 4A-B with respect to template 401. Also as in the example of FIG. 4A-B, the content regions stay in the same position with respect to a frame of reference 502 of the display device, while the content within the content regions counter-rotate in place to offset the rotation of the display device so that they stay in the same orientation with respect to a constant (non-rotating) frame of reference.

The examples shown in FIGS. 4A-5B are examples of the templates that may be included in the template database 137 of the content processing system 130. The templates may be defined, for example, in JSON format. The templates in the template database 137 may share characteristics that make each of them appropriate for use in laying out content for display on the client 140 in both portrait orientation and landscape orientation, such as overall dimensions, and dimensions of slots. The templates may be client-device specific, with different sets of templates based on the screen size of the device; thus different template sets can be provided for various different sizes of tablet computers, as well as smartphone or the like. For example, a set of templates stored in a template database 137 may be designed for an iPad® tablet computer from Apple Inc., of Cupertino, Calif., to have dimensions such that when content items are displayed according to any of the templates in the set on the device, the content is presented as a single readable page, without the need for scrolling. The templates included in a template database 137 that are specific to a different client device that has different display characteristics may be different. Generally, templates in the template database 137 are reusable for various content items across various sources 111 for efficiency. For example, the template database 137 may contain on the order of one hundred templates, which provide a visual variety of layouts having slots for a variety of different numbers of content items.

Rotation of Content Regions in a Page Template

Figure 6:
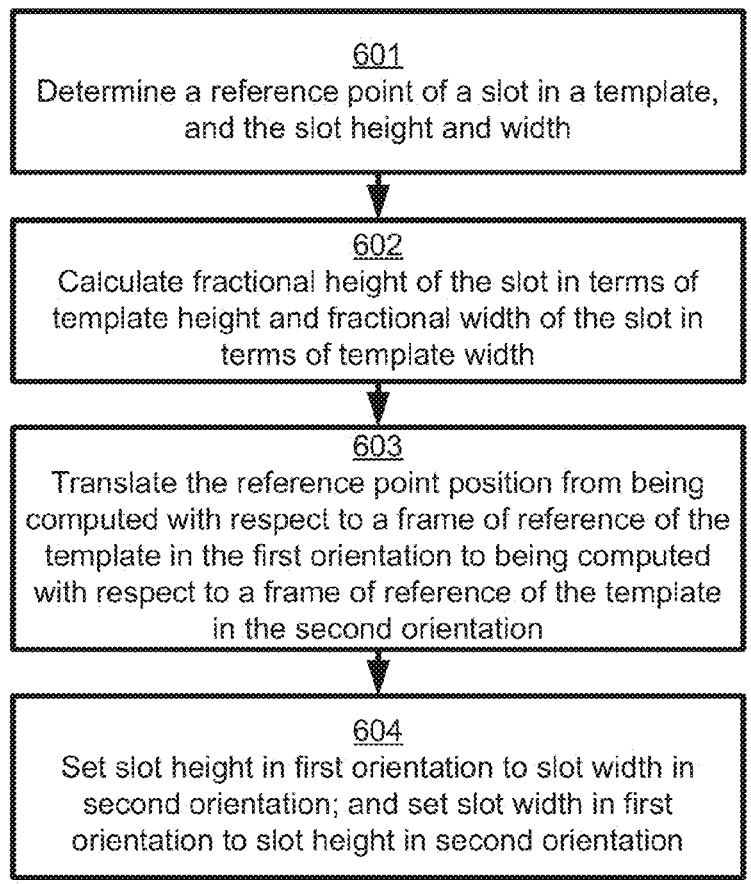
FIG. 6 is a flow chart illustrating a method of determining a slot position, height and width in a template in a second orientation from the slot's position, height, and width in the template in a first orientation.

FIG. 6 is a flow chart illustrating a method of determining a slot position, height and width in a template in a second orientation from the slot's position, height, and width in the template in a first orientation. This method may be implemented, for example, by the rotation instruction module 138 of the content processing system 130 to rotate a template as displayed on a client 140. Alternatively, the rotation instruction module 138 may provide instructions to the client 140 that when executed by the client 140 cause the template displayed on the client 140 in a first orientation to rotate to the second orientation, or vice versa. The method may be performed using a different sequence or combination of steps than illustrated here, and may be performed concurrently in multiple threads.

In this example, a reference point of a slot in a template and the slot height and width are determined 601. The reference point of a slot may correspond to a corner of the slot, such as the upper left corner, a midpoint of the slot, or any other point in the slot selected for convenience. The reference point of a slot may be determined with respect to the frame of reference of the display device while the template is in a first orientation. The slot height and width provide the overall dimensions of the slot, and may also be expressed in terms of the frame of reference of the display device while the template is in a first orientation.

Then, the fractional height of the slot in terms of the template height and fractional width of the slot in terms of the template width are calculated 602. Thus, the dimensions of the slot are determined in terms of the template dimensions. Alternatively, the dimensions of the slot can be determined in terms of number of pixels or other units of measurement.

To determine where the slot belongs in the template in the second orientation, the reference point position is translated 603 from being computed with respect to a frame of reference of the template in the first orientation to being computed with respect to a frame of reference of the template in the second orientation. This is accomplished, for example, by exchanging the x and y coordinates of the reference point, and, for templates native to portrait orientation, performing a mirroring operation across the vertical axis of the page in order to preserve the apparent position of items on the page.

Lastly, the slot height in the first orientation is set 604 to the slot width in the second orientation, and the slot width in the first orientation is set to the slot height in the second orientation. Thus, in this embodiment, the slot maintains the same area in the second orientation as in the first orientation, but the dimensions are reversed.

Figure 7:
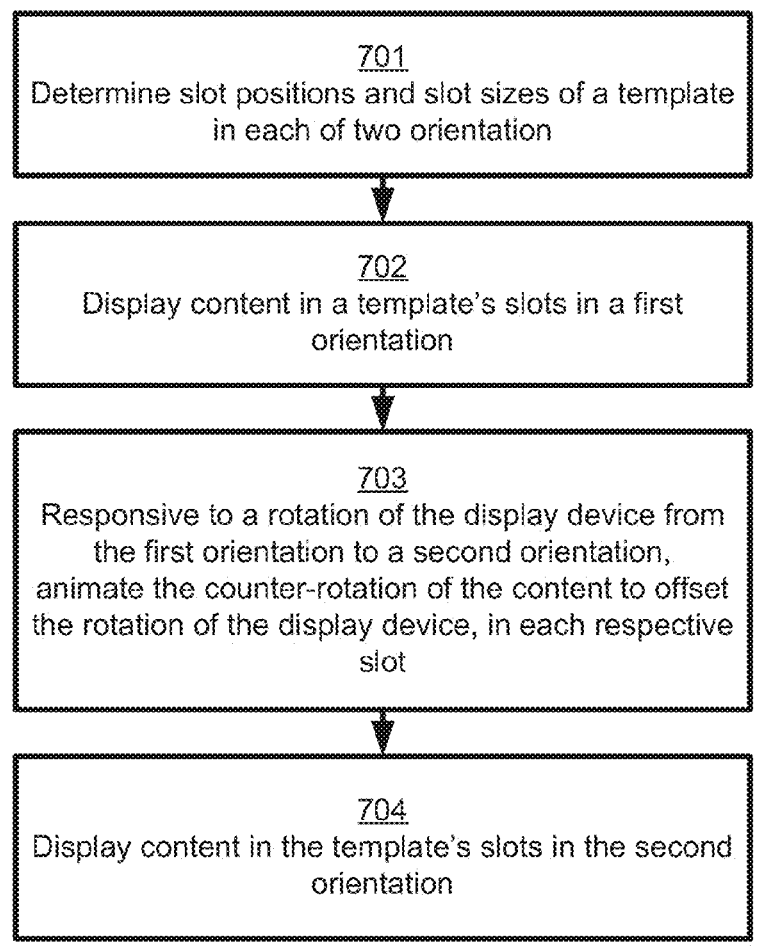
FIG. 7 is a flow chart illustrating a method of adjusting the orientation of content regions of a page layout, in accordance with an embodiment.

FIG. 7 is a flow chart illustrating a method of adjusting the orientation of content regions of a page layout, in accordance with an embodiment. The method may be performed on a client 140 according to instructions from the rotation instruction module 138 of the content processing system 130. The method may be performed using a different sequence or combination of steps than illustrated here, and may be performed concurrently in multiple threads.

First, the slot positions and slot sizes of a template in each of two orientations is determined 701. The determination can be made by the client 140 in response to receiving instructions for display of the template in each of two orientations from the content processing system 130. Alternatively, this determination can be accomplished according to the method illustrated in FIG. 6, executed, for example, by the rotation instruction module 138.

The client 140 displays 702 content in a template's slots in a first orientation. The first orientation may be either portrait orientation or landscape orientation, and may be selected responsive to the orientation sensed by a rotation sensor 144 of the client 140.

Responsive to a rotation of a display of a client device 140 from a first orientation to a second orientation, the counter-rotation of the content to offset the rotation of the display of the client device is animated 703. From the perspective of the user of the client device 140, as the device changes from portrait orientation to landscape orientation, each of the content regions appear to stay in the same relative position with respect to a frame of reference of the client device 140, but the content counter-rotates within each of the content regions to maintain the same orientation with respect to a constant (non-rotating) frame of reference (outside of the client device 140). Because the height and width of each slot is being exchanged as a result of rotation, after rotation, the content is laid out within the slot to match the slot's new dimensions. For example, images may be repositioned and resized within the slot and text may be reflowed into the slot. Lastly, the content in the template's slots is displayed 704 in the second orientation.

For example, if a screen display in a first position is rotated 90 degrees in a first direction (clockwise or counterclockwise) in order to switch the display from a first (portrait or landscape) orientation to a second (landscape or portrait) orientation, the content is correspondingly turned a quarter turn in the opposite direction (counter-clockwise or clockwise) so that the content will appear right side up in the second orientation. In one embodiment, there are only two orientations of the template available, and the rotation of the content is animated to alternate between the two states. Therefore, continuing with this example, if a screen display is rotated another 90 degrees in the first direction (clockwise or counter-clockwise) in order to switch the display back from the second (landscape or portrait) orientation to the first (portrait or landscape) orientation, the content is correspondingly rotated 90 degrees in the opposite direction, but the content regions are animated as they move back to their original, first positions. Thus, regardless of the starting position, after two 90 degree rotations in the same direction, display is physically upside down from the starting position, but the content is displayed in the same orientation and layout as in the starting position.

A specific example of this embodiment is illustrated in FIGS. 8A-D for rotating the display in a counter-clockwise direction. FIG. 8A illustrates the example template 401 of FIG. 4A, including three content regions F, G, H. The arrow 881 above the template 401 indicates the direction of a 90 degree rotation (here, counter-clockwise) of the display to arrive at FIG. 8B. The arrow 882 above each of the content region letters F, G, and H indicates the direction of the 90 degree counter rotation (here clockwise) of the content to arrive at the content being right side up in FIG. 8B. FIG. 8C illustrates the same layout as shown in FIG. 8B. The arrow 883 above the template 401 indicates another 90 degree rotation in the counter-clockwise direction needed to move from FIG. 8C to FIG. 8D, while the arrows 884 above each of the content region letters F, G, and H in FIG. 8C indicates the 90 degree counter-rotation in the clockwise direction needed to arrive at the content being right side up in FIG. 8D. In this example, to change from FIG. 8C to FIG. 8D, the content regions are animated to move back into their original relative positions shown in FIG. 8A rather than appearing to rotate in place. By having only two states in which the template exists, no matter how many 90 degree rotations have taken place, the layout in portrait orientation is consistent, and the layout in landscape orientation is consistent. Note that the reference axis 402 in FIG. 8D shows that the template is now upside down with respect to the original position in FIG. 8A, but the layout shown in FIG. 8D is the same as the layout shown in FIG. 8A, with respect to size, shape, and relative positions of the content regions. If the user had undertaken a quarter turn clockwise from the position shown in FIG. 8C (rather than the indicated counter-clockwise rotation), then the content in the content regions marked with letters F, G, and H would have all rotated 90 degrees counter-clockwise, and they would have appeared to rotate in place back to the original position shown in FIG. 8A.

Figure 9A:
FIG. 9A is an example of a page in portrait orientation in accordance with an embodiment.
Figure 9B:
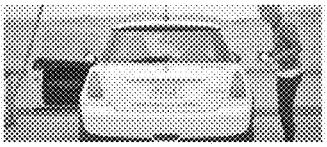
FIG. 9B illustrates the example of FIG. 9A in landscape orientation.

FIG. 9A is an example of a page of a social magazine with items from a variety of sources laid out on a common page according to a template in portrait orientation, and FIG. 9B is the example template of FIG. 9A shown in a landscape orientation. When the user rotates the display a quarter turn in the counter-clockwise direction starting with the portrait orientation, each slot appears to stay in its same position with respect to a frame of reference of the display device. The content within each slot counter-rotates to offset the rotation of the display device. Thus, the content within the slots maintains an orientation with respect to a constant (non-rotating) frame of reference, regardless of the orientation or rotation of the display device. FIG. 9B illustrates the position and orientation of the content items in the content regions of the template after the quarter turn has been completed.

Figure 10A:
FIG. 10A is another example of a page in landscape orientation in accordance with an embodiment.
Figure 10B:
FIG. 10B illustrates the example of FIG. 10A in portrait orientation.

FIG. 10A is another example of a page of a social magazine with items from a variety of sources laid out on a common page according to a template in a landscape orientation, and FIG. 10B is the example of FIG. 10A shown in a portrait orientation. When the user rotates the display a quarter turn in the clockwise direction starting with the landscape orientation, each slot appears to stay in its same position with respect to a frame of reference of the display device. The content within each slot counter-rotates to offset the rotation of the display device. Thus, the content within the slots maintains an orientation with respect to a constant (non-rotating) frame of reference, regardless of the orientation or rotation of the display device. However, in this example, three adjacent short content items 991, 992, 993 are treated for rotation purposes as if they were a single content item belonging to a single collective slot having dimensions equal to the combined height and the combined width of the three slots in which content items 991, 992, and 993 reside. This approach of treating certain groups of content items collectively may be preferred in instances where the exchange of the dimensions of an individual slot (for example, a short and wide slot) would lead to awkward slot dimensions (in this example, a tall and narrow slot) for fitting the content item. By creating a group of adjacent content items that together approximate closer to a 1:1 aspect ratio for the collective slot, the aspect ratio for each individual content item can remain closer to the original after the rotation, as demonstrated for content items 991, 992, and 993 in FIGS. 10A and 10B.

Additional Configuration Considerations

The present invention has been described in particular detail with respect to several possible embodiments. Those of skill in the art will appreciate that the invention may be practiced in other embodiments. Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for adjusting a layout of a page of content, the method comprising:
   receiving a page template including a plurality of slots, each slot defining a portion of a display of a client device within which a content item is displayed;
   displaying a content item in each of the slots of the page template on the display of the client device while the client device is in a first orientation;
   detecting a rotation of the client device to a second orientation, the rotation with respect to a reference orientation, the reference orientation specifying positions of slots in the page template relative to each other within the display of the client device based on a reference point of the display of the client device; and;
   responsive to the detected rotation of the client device, displaying the content items within the page template on the display of the client device in the second orientation such that:
      the template and the plurality of slots are rotated with respect to the reference orientation to match the rotation of the client device so positions of the slots relative to each other in the second orientation based on the reference point of the display of the client device match positions of the slots relative to each other in the first orientation based on the reference point of the display of the client device,
      the content items within each of the slots are rotated with respect to the display of the client device to maintain a constant orientation of the content items relative to the reference orientation, and
      one or more dimensions of at least one of the content items are modified to fit the content item within its respective slot based on the rotation of the slot that contains the content item.

2. The method of claim 1, wherein the first orientation is a portrait orientation and the second orientation is a landscape orientation.

3. The method of claim 1, wherein the rotation of the client device to the second orientation is a 90 degree counter-clockwise rotation, and the rotation of the content items within each of the slots is a 90 degree clockwise rotation.

4. The method of claim 1, further comprising:
   responsive to detecting a rotation of the client device from the second orientation to a third orientation, displaying the content items within the page template on the display of the client device such that:
      the template and the plurality of slots are rotated with respect to the reference orientation to match the rotation of the client device so positions of the slots relative to each other in the third orientation based on the reference point of the display of the client device match positions of the slots relative to each other in the first orientation based on the reference point of the display of the client device,
      the content items within each of the slots are rotated with respect to the display of the client device to maintain a constant orientation of the content items relative to the reference orientation, and
      one or more dimensions of at least one of the content items are modified to fit the content item within its respective slot based on the rotation of the slot that contains the content item.

5. The method of claim 1, wherein the one or more dimensions of at least one of the content items are modified by modifying a layout of the content item presented in the respective slot.

6. The method of claim 5, wherein the content item comprises an image, and modifying the layout of the content item presented in the respective slot comprises repositioning the image within the slot.

7. The method of claim 5, wherein the content item comprises text, and modifying the layout of the content item presented in the respective slot comprises modifying the text within the slot.

8. A method for displaying content, the method comprising:
receiving a page template including a plurality of slots, each slot defining a portion of a display of a client device within which a content item is displayed;
receiving a plurality of content items for display in the page template;
assigning each of the content items to a slot of the page layout;
generating a first layout of the content items, the layout comprising each of the content items contained in the slot of the page template to which the content item is assigned;
displaying the first layout on the display of the client device;
detecting a rotation of the display of the client device from a first orientation to a second orientation;
responsive to the detected rotation of the display of the client device, generating a second layout of the content items where positions of the slots of the page template relative to each other in the second layout match positions of the slots relative to each other in the first layout based on a reference point of the display of the client device, where content items assigned in each slot are rotated within the slot with respect to the page template in a direction opposite to the detected rotation of the device to maintain a constant orientation of the content items in the first orientation and in the second orientation, and where the one or more of the content items are modified to fit within their respective slots based on the rotation of the slots that contain the one or more content items and
displaying the second layout on the display of the client device while the display of the client device is in the second orientation.

9. The method of claim 8, wherein the first orientation is a portrait orientation and the second orientation is a landscape orientation.

10. The method of claim 8, wherein at least one or more of the content items comprises an image, and where the at least one content item is modified to fit within its respective slot by repositioning the image within the respective slot.

11. The method of claim 8, wherein at least one or more of the content items comprises text, and where the at least one content item is modified to fit within its respective slot by modifying the text within the slot.

12. A computer program product comprising a non-transitory computer-readable storage medium storing computer executable code, the code when executed by a computer processor performs a method comprising:
receiving a page template including a plurality of slots, each slot defining a portion of a display of a client device within which a content item is displayed;
displaying a content item in each of the slots of the page template on the display of the client device while the client device is in a first orientation;
detecting a rotation of the client device to a second orientation, the rotation with respect to a reference orientation, the reference orientation specifying positions of slots in the page template relative to each other within the display of the client device based on a reference point of the display of the client device; and;
responsive to the detected rotation of the client device, displaying the content items within the page template on the display of the client device in the second orientation such that:
the template and the plurality of slots are rotated with respect to the reference orientation to match the rotation of the client device so positions of the slots relative to each other in the second orientation based on the reference point of the display of the client device match positions of the slots relative to each other in the first orientation based on the reference point of the display of the client device,
the content items within each of the slots are rotated with respect to the display of the client device to maintain a constant orientation of the content items relative to the reference orientation, and
one or more dimensions of at least one of the content items are modified to fit the content item within its respective slot based on the rotation of the slot that contains the content item.

13. The computer program product of claim 12, wherein the first orientation is a portrait orientation and the second orientation is a landscape orientation.

14. The computer program product of claim 12, wherein the rotation of the client device is a 90 degree counter-clockwise rotation, and the rotation of the content items within each of the slots is a 90 degree clockwise rotation.

15. The computer program product of claim 12, wherein the method performed by the computer processor when the code is executed further comprises:
responsive to detecting a rotation of the client device from the second orientation to a third orientation, displaying the content items within the page template on the display of the client device such that:
the template and the plurality of slots are rotated with respect to the reference orientation to match the rotation of the client device so positions of the slots relative to each other in the third orientation based on the reference point of the display of the client device match positions of the slots relative to each other in the first orientation based on the reference point of the display of the client device,
the content items within each of the slots are rotated with respect to the display of the client device to maintain a constant orientation of the content items relative to the reference orientation, and
one or more dimensions of at least one of the content items are modified to fit the content item within its respective slot based on the rotation of the slot that contains the content item.

16. A computer program product comprising a non-transitory computer-readable storage medium storing computer executable code, the code when executed by a computer processor performs a method comprising:
receiving a page template including a plurality of slots, each slot defining a portion of a display of a client device within which a content item is displayed;
receiving a plurality of content items for display in the page template;
assigning each of the content items to a slot of the page layout;

generating a first layout of the content items, the layout comprising each of the content items contained in the slot of the page template to which the content item is assigned;

displaying the first layout on the display of the client device;

detecting a rotation of the display of the client device from a first orientation to a second orientation;

responsive to the detected rotation of the display of the client device, generating a second layout of the content items where positions of the slots of the page template relative to each other in the second layout match positions of the slots relative to each other in the first layout based on a reference point of the display of the client device, where content items assigned in each slot are rotated within the slot with respect to the page template in a direction opposite to the detected rotation of the device to maintain a constant orientation of the content items in the first orientation and in the second orientation, and where the one or more of the content items are modified to fit within their respective slots based on the rotation of the slots that contain the one or more content items and displaying the second layout on the display of the client device while the display of the client device is in the second orientation.

17. The computer program product of claim 16, wherein at least one or more of the content items comprises an image, and where the at least one content item is modified to fit within its respective slot by repositioning the image within the respective slot.

18. The computer program product of claim 16, wherein at least one or more of the content items comprises text, and where the at least one content item is modified to fit within its respective slot by modifying the text within the slot.

* * * * *